Aug. 27, 1940.    M. H. GROVE    2,212,709
FLUID FLOW REGULATOR
Filed Dec. 5, 1936    2 Sheets-Sheet 1
FIG_1_
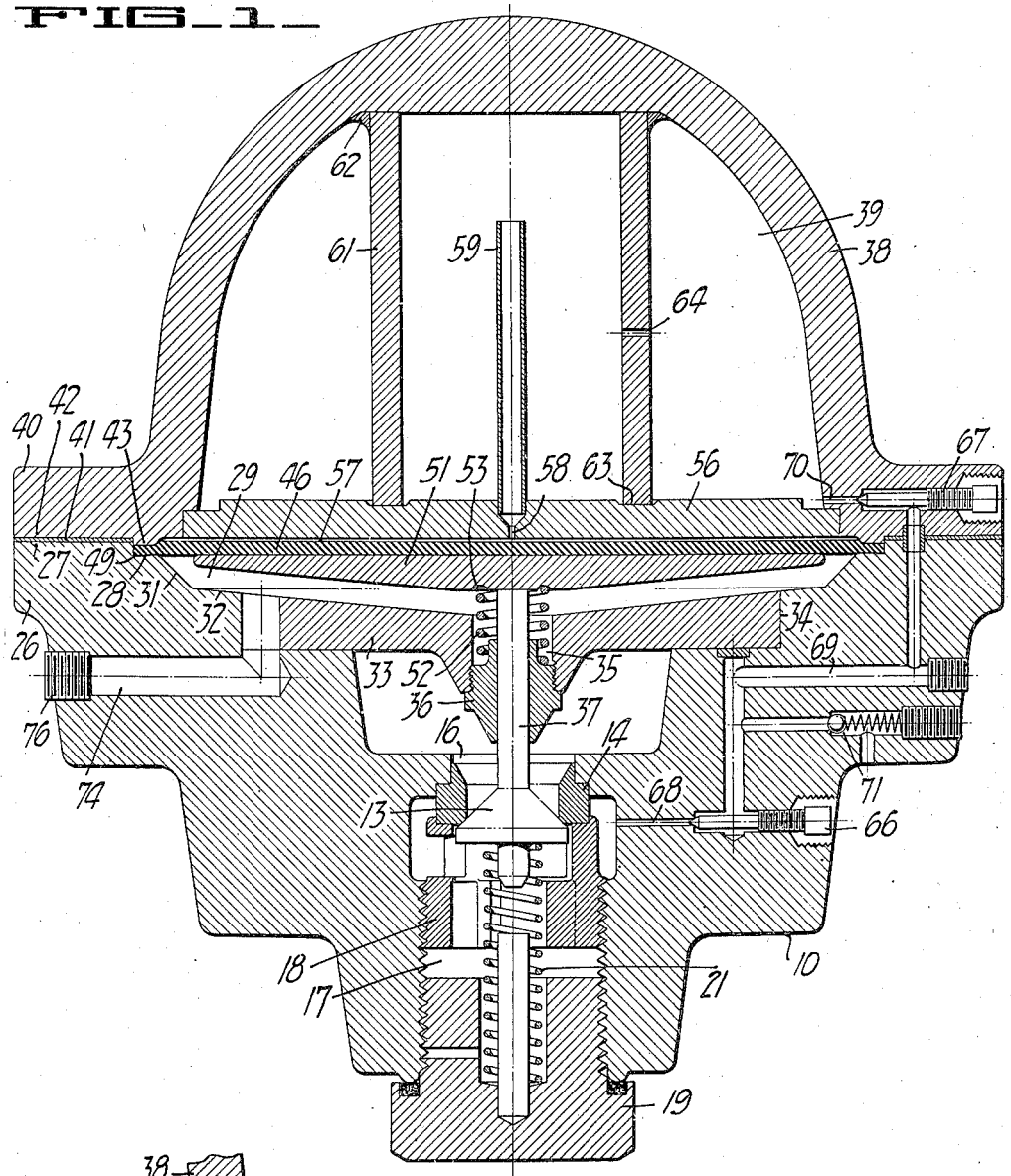
FIG_2_
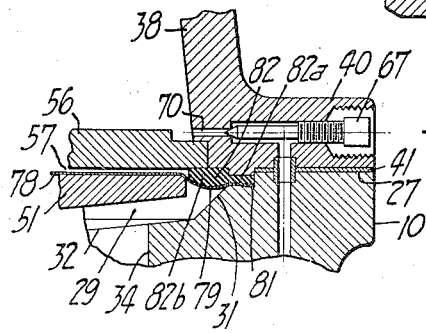
INVENTOR.
Marvin H. Grove
BY Paul D. Flehr
ATTORNEY.

Aug. 27, 1940.   M. H. GROVE   2,212,709
FLUID FLOW REGULATOR
Filed Dec. 5, 1936   2 Sheets-Sheet 2
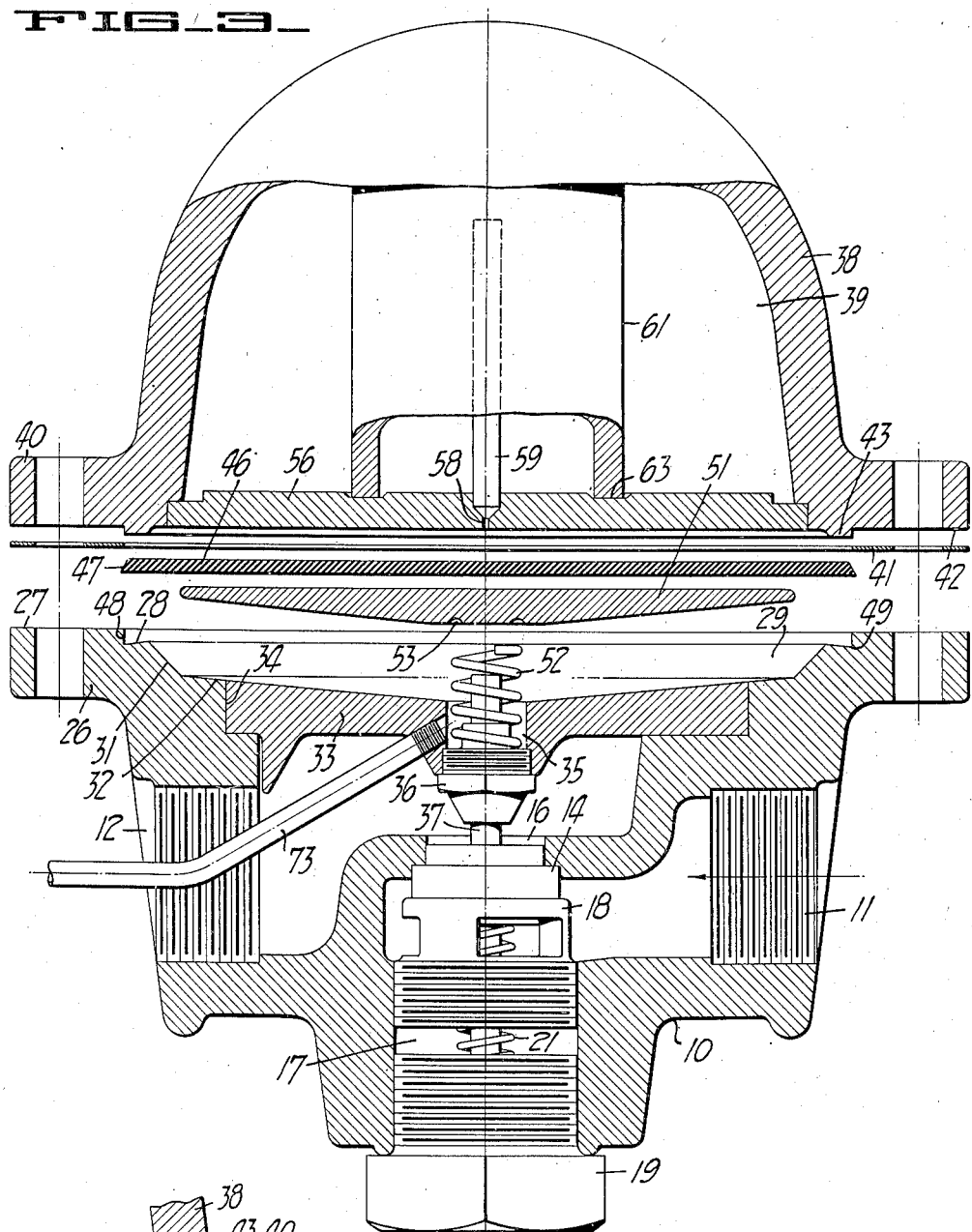
INVENTOR.
Marvin H. Grove
BY Paul D. Flehr
ATTORNEY.

Patented Aug. 27, 1940

2,212,709

UNITED STATES PATENT OFFICE 2,212,709

FLUID FLOW REGULATOR

Marvin H. Grove, Berkeley, Calif.

Application December 5, 1936, Serial No. 114,406

3 Claims. (Cl. 50—21)

This invention relates generally to devices for automatically regulating the flow of fluid, and such as are employed to supply fluid at a substantially constant pressure to a point of fluid demand, from a relatively higher pressure source of fluid supply.

It is an object of the invention to improve in certain respect upon the regulator disclosed and claimed in my Patent No. 2,047,101, granted July 7, 1936. The improved features, disclosed and claimed herein, can be briefly outlined as follows: The provision of a simplified diaphragm assembly, whereby the flexible diaphragm element need not be apertured, and whereby utmost simplicity is afforded for manufacture and assembly; the provision of means to prevent mechanical failure of the so-called baffle wall, which as will be presently explained, cooperates with the diaphragm assembly to prevent chattering of the valve member; the provision of means tending to protect the flow restricting orifice which extends through the baffle wall, thereby preventing accidental clogging; and a novel diaphragm assembly, which will promote a proper high pressure seal, and which will protect the diaphragm against deterioration and failure.

Further features and objects of the present invention will appear from the following description, in which the preferred embodiment of the invention has been described in detail, in conjunction with the accompanying drawings.

Referring to the drawings:

Fig. 1 is a side elevational view, in cross-section, illustrating a regulator incorporating the present invention.

Fig. 2 is a cross-sectional detail, illustrating a modified form of diaphragm assembly, using a sheet metal diaphragm, in place of a diaphragm element of resilient rubber.

Fig. 3 is a side elevational view of the regulator shown in Fig. 1, the cross-sectional plane however, being at right angles to the cross-sectional plane of Fig. 1, and the parts being excluded to illustrate assembly.

Fig. 4 is a fragmentary cross-sectional detail, but showing the diaphragm displaced.

The regulator illustrated in Figs. 1 and 3 is of the direct acting type, that is, without a so-called pilot valve, and is designed particularly for use on gas flow lines where the inflow pressure may be of relatively high value. The principal parts consist of a body 10, provided with inflow and outflow openings 11 and 12, respectively. When in use, piping connected to the inflow opening 11 serves to supply gas at a relatively high pressure, while piping connected to the outflow opening 12 supplies a low pressure system from which gas is to be consumed.

Thus there is a single movable valve member 13 cooperating with a suitable annular seat ring 14. The seat ring 14 is fitted within a bore 16, which in turn communicates between the inflow and outflow openings 11 and 12. Concentric with the seat ring 14 there is a bore 17, which extends to the exterior of the valve body 10. A ported sleeve 18 is threaded into bore 17, and the upper end of this sleeve pressed upon ring 14, thereby retaining the same in proper position. A threaded plug 19 serves to seal the bore 17 with respect to the exterior atmosphere. The inner threaded portion of this plug is provided with a vent 20 through which gas may escape when the plug is partially removed. This is a safety feature to prevent blowing out of the plug by internal pressure, while it is being removed. In order to normally retain the valve member 13 upon the seat ring 14, a relatively light compression spring 21 is provided, which has its lower end seated within plug 19, and its upper end seated upon the valve member 13.

While the material of which body 10 is constructed may vary in practice, I prefer to utilize a steel forging, particularly where the regulator is to be used for relatively high pressures. One side of the body 10 (the upper side as illustrated in Figs. 1 and 3), is enlarged to form a flange 26. This side of the body is also machined away to provide the outer annular surface 27, the recessed annular surface 28, and the recess 29. The recess 29 is shown formed with a bevelled periphery 31, and a lower dished surface 32. To facilitate manufacture in the form of a forging, a part of the body consists of an annular filler plate 33. This filler plate is machined to have a press fit within the machined recess 34, formed in the body 10, and is concentric with respect to the valve 13 and valve seat 14. The center of filler plate 33 is provided with a bore 35 to accommodate the bushing 36, and this bushing serves as a guide for the valve stem 37.

The regulator described herein is of the type which is loaded by trapped gas under pressure. Thus there is a dome member 38, the interior of which forms a closed gas chamber 39, and which is made of metal impervious to gas pressure, such as a suitable steel forging. The dome has a flange 40, adapted to be bolted upon the flange 26 of the body. A gasket 41 is shown interposed between the annular surface 27 and the complementary surface 42 formed on the dome. The dome is also provided with an offset annular surface 43, which cooperates with the annular surface 28, to securely clamp the peripheral edge portion of a flexible diaphragm 46.

In this instance the diaphragm 46 is formed of resilient material, as for example resilient vulcanized rubber. The gripping of its peripheral edge portion occurs in such a manner that a high pressure seal is established, to prevent leakage from either the dome or the body of the regulator. Referring to Fig. 3 it will be noted that the uncompressed peripheral edge of the diaphragm 46 is bevelled, as indicated at 47. Also the recessed annular surface 28 is slightly undercut, that is, it is formed slightly conical. Before the dome is clamped down upon the body, the diaphragm 46 readily fits within the recess above surface 28, since its outer diameter is approximately the same as the diameter of the shoulder 48. However, when the dome is clamped down upon the body, the rubber forming the peripheral edge portion of the diaphragm tends to flow outwardly, to be pressed in tight sealing engagement with the annular surface 48, and surfaces 28 and 43, and to be virtually wedged into the corner junction represented by numeral 49 in Fig. 1. The beveling of the diaphragm affords a space in which the edge portion of the diaphragm may flow when compressed, thus avoiding material flow of rubber with attendant crushing action on the rubber. With such an arrangement high pressures can be maintained in the chamber 39 for long operating periods, provided the remainder of the dome is properly impervious to escapement of gas.

In contact with one side of the diaphragm 46, there is a thrust plate 51, which is annular in contour, and which has its center portion engaging the upper end of the valve stem 37. A light compression spring 52 is employed for urging the thrust plate 51 upwardly, independently of the upward thrust of compression spring 21. The lower end of spring 52 is shown seated upon the bushing 36, while the upper end of this spring is seated within a small annular recess 53, which is formed in the lower face of the thrust plate. In some instances the rubber diaphragm 46 may be secured to the adjacent face of the thrust plate 51, as by means of a vulcanized bond between these parts. In such event the thrust plate 51 becomes an integral part of the diaphragm assembly. However, such attachment is not necessary, and in fact a simpler arrangement is to have no particular attachment between the diaphragm and the thrust plate 51, and to depend upon the engagement of compression spring 52 with recess 53, to generally retain the thrust plate in properly aligned position.

It will be noted that the lower face of thrust plate 51 is shaped to be substantially parallel with the corresponding opposed surface 32 of the recess 29. Thus when the diaphragm 46 has been flexed to the limiting position illustrated in detail in Fig. 4, the lower face of plate 51 is in contact with surface 32, and if the upper side of the diaphragm 46 is exposed to extreme fluid pressures, that portion of the diaphragm extending beyond the outer edge of thrust plate 51, engages and is supported by the bevelled edge 31. Thus with even extremely high pressures within the chamber 39, there will be no danger of disrupting the diaphragm, and repeated flexing of the diaphragm during operation of the regulator, will cause no abnormal deterioration tending to cause a breakage or leakage.

In common with the disclosure of my aforesaid Patent No. 2,047,101, a relatively rigid baffle plate 56 extends over the other side of the diaphragm 46, and across the face of the dome 38. It is desirable in this connection to also provide a press fit between the periphery of plate 56, and the adjacent walls of the dome 38, and to so machine the parts that when the regulator is assembled, a small amount of clearance 57 is afforded between the adjacent parallel faces of the baffle plate and the diaphragm 46. It will be noted that the lower surface of baffle wall 56 is flat or planor, which is made possible by the fact that this lower surface cooperates directly with the adjacent face of the rubber diaphragm 46. The space 57 is in restricted communication with the remainder of the chamber 39, through the relatively small flow restricting orifice 58. In order to preclude possible clogging of this orifice, or entrance of liquid into the space 57, this orifice communicates through a small tube or standpipe 59, the lower end of which is attached to the plate 56, and the upper end of which is open.

It has been found that in the operation of my regulator the baffle plate 56 is subjected to relatively high stresses. In order to avoid possible mechanical failure, reinforcing means is provided in the form of a tubular strut 61. One end of this strut is secured to the dome 38, as by means of a weld connection 62. The other end of the strut is machined, to engage an accurately machined surface 63, formed on the inner face of the baffle plate 56. Free communication between the interior and the exterior of strut 61 is secured by the opening 64.

An arrangement of needle valves is provided to facilitate introduction of a predetermined amount of gas pressure into the dome chamber 39. Thus two needle valves 66 and 67 are provided, the first being in the body 10, and the second in the flange of the dome 38. Opening of both needle valves permits introduction of gas from the inflow side of the regulator to the chamber 39, through the ducts 68, 69 and 70. If pressure increases beyond a certain safe value, gas is discharged to the atmosphere through the pressure release valve 71. Normally both of these valves 66 and 67 are maintained tightly closed, to maintain a predetermined pressure within the chamber 39.

Normally the recess or space 29 below the diaphragm 46, is in communication with the outflow side of the regulator. Instead of having such communication directly through a port in the filler plate 33, the communication may be through a pipe 73, which is indicated at Fig. 3 as extending into the outflow pipe connection. Another alternative, as shown in Fig. 1, is to have a duct 74 communicating with space 29, and leading to the exterior of the body 10. This duct 74 may be normally closed by a plug 76, but when desired it can be connected to a pipe, which in turn can lead to the outflow side of the regulator, at any desired point. In most operations however there will be a direct communication between space 29 and the outflow side of the regulator, as for example a communication such as would be formed by removing the pipe 73. Such communication is not flow restricting to any material degree, and any passage employed for establishing communication between the underside of the diaphragm 46 and the outflow side of the regulator, is many times the diameter of the orifice 58.

The operation of a regulator such as described above, has been outlined in my Patent No. 2,047,101. Briefly the pressure maintained on the outflow side of the regulator, will correspond substantially to the pressure maintained in the chamber 39. The action of the baffle wall 56, together with the flow restricting orifice 58, serves to impose restrictions of high magnitude upon abrupt opening and closing movements of the valve member 13, while the valve member is adjacent its seat. This is because of rarefaction of the gas pressure in space 57, when the diaphragm suddenly moves away from the baffle wall 56, or to compression of gas in this space, as the diaphragm attempts to abruptly return to its initial position. However when the valve member is in intermediate or full open positions, the clearance represented by space 57 is materially larger, so that given increments of abrupt movement do not occasion wide variations in gas pressure. Thus, while the baffle 56 together with orifice 58, will prevent slapping and chattering of the valve member 13 upon its seat, there is no serious damping to movements of the diaphragm insofar as normal operating flow rates and pressures are concerned, and the regulator is therefore unusually sensitive in responding to pressure variations. Also for normal flow rates the diaphragm and the valve member can hunt at a rapid rate, to preclude clogging by ice formation.

The dimensioning of the parts may be like the dimensioning outlined generally in my Patent No. 2,047,101. Thus with a regulator which has been operated with good results, for a variation of inflow pressure from 2500 to 3500 pounds per square inch, over a range of outflow pressures varying from 100 to 1200 pounds per square inch, the diaphragm 46 measured about 7¼ inches in diameter, the diaphragm and the valve member had a maximum travel of about ⅜ of an inch, the clearance, represented by space 57 was about 1/32 of an inch, and the orifice 58 measured about 0.52 inch in diameter. It will be evident that an increase in the vertical dimensioning of space 57 tends to minimize the compensating forces produced as explained above. For this reason the clearance is made relatively small, it being substantially less than the total travel of the diaphragm and valve member, in the example given. In general it is desirable that the diaphragm 46 be relatively flexible, so that the regulator will have utmost sensitivity and accuracy. The use of relatively stiff rubber, such as is sometimes employed for gaskets, may permit the use of a larger orifice 58, but such practice is not recommended, particularly where sensitivity and accuracy is desired. In the example cited above, the variation in outflow pressure over a wide range of demand, and over a wide range of variations in inflow pressure, do not exceed five pounds.

The use of a metal diaphragm, in place of the diaphragm made of resilient vulcanized rubber, is to be preferred if the regulator is employed in handling fluids tending to deteriorate rubber, as for example gases containing petroleum vapors. A type of metallic diaphragm which has given good results, is shown in Fig. 2. In this case the diaphragm 78, corresponding to the rubber diaphragm 46 of Figs. 1 and 3, is constructed of suitable sheet metal. A material which has given good results is relatively hard and resilient Monel metal. The main area of diaphragm 78, which is engaged by the adjacent face of thrust plate 51, is flat, while an annular portion 79, extending intermediate the periphery of plate 51, and the peripheral edge portion 81 is grooved or cupped downwardly. A special gasket ring 82 is provided, one portion 82a of which engages the peripheral edge portion 81 of the diaphragm, and the other portion 82b of which has a lower conflex face, to fit the adjacent groove in the diaphragm. Thus the gasket 82 not only effects a seal with respect to the peripheral edge of the diaphragm, but also forms an upper abutment surface for engagement with the cupped portion 79 of the diaphragm, which is that portion of the diaphragm which flexes. Such a diaphragm can be flexed over a distance of say ¼ of an inch, without causing breakage or deterioration of the metal, and at the same time the diaphragm is of sufficient strength to withstand high pressure to which it may be subjected. In practice gasket 82 can be formed of suitable composition, preferably to an internal diameter which is slightly greater than that desired after assembly. After assembly deformation of portion 82a reduces the internal diameter to a proper value. A small upturned flange or lip 84 is provided on the diaphragm 78 in order to more securely anchor the same, thus avoiding inward slippage.

A feature of my construction is that the valve member 13 may align itself to properly seal at all times upon the seat ring 14. This is due in part to the fact that sufficient tolerance for self-aligning movement is provided in the fit between stem 37 and bushing 36, and the absence of a positive attachment of the stem with the diaphragm; also at times, when the regulator is closing abruptly, diaphragm 46 is pressed into contact with baffle wall 56, and at such times there is no engagement whatever with the stem 37. Thus under such conditions the valve member closes accurately, but does not carry the severe forces impressed upon the diaphragm. Such lost motion between the stem and the diaphragm also insures continued sealing of the valve member even after considerable wear may have occurred.

I claim:

1. In a fluid pressure regulator, a body having passages for inflow and outflow of fluid, a valve member within the body and having a travel of movement in opposite directions between open and closed positions to control flow of fluid through the same, a flexible diaphragm mounted within the body, and overlying said valve member, means forming a closed chamber upon the upper side of said diaphragm adapted to contain a predetermined amount of gas under pressure, a relatively rigid baffle wall extending across the upper face of said diaphragm and in relatively close proximity to the same, an orifice in said wall forming a restricted communication between the space between the wall and the diaphragm, and the remainder of the gas chamber, a pipe mounted upon said plate and extending in a vertical direction from the same, the lower end of said pipe being in communication with said orifice, and the upper end of said pipe being in communication with said chamber, and means engaging the lower side of the diaphragm and serving to form an operative connection with said valve member.

2. In combination with a fluid pressure regulator of the type including a main body part having passages for inflow and outflow of fluid, a dome secured to the main body part and serving to retain trapped gas under pressure, a valve member within the body and having a travel of movement in opposite directions between open and closed positions to control flow of fluid through the same, a flexible diaphragm mounted within the body and extending across the inner face of the dome, the diaphragm being connected with the valve member, a relatively rigid wall mounted within the dome and extending in relatively close parallel relationship to the adjacent face of said diaphragm, whereby a confined fluid space is formed between said wall and the adjacent face of the diaphragm, and means forming a flow restricting communication between said confined space and the interior of the dome; a rigid reinforcing strut disposed within the dome, one end of said strut engaging the inner face of said rigid wall and the other end of the same engaging the opposite wall of the dome.

3. In a device of the character described, a body having passages for inflow and outflow of fluid, a valve member within the body and having a travel of movement in opposite directions between open and closed positions to control flow of fluid through the same, operating means for said valve member comprising a circularly contoured flexible diaphragm mounted in the valve body, said diaphragm having its peripheral edge portion attached to the body, a circularly contoured thrust plate engaging the lower face of the diaphragm, the thrust plate extending over substantially the entire area of the diaphragm except for a minor annular portion of the same, the body below the diaphragm forming a chamber and a surface forming an abutment against which the lower face of the thrust plate may seat when the diaphragm is in its lowermost limiting position, a stem or rod extending upwardly from the valve member to the central portion of the thrust plate, the upper end of the stem having simple abutting engagement with the plate, a coiled spring surrounding the upper end of the stem, the spring having a relatively small diameter compared to the diameter of the thrust plate, means formed on the lower face of the plate for seating the upper end of the spring, the body about the stem having an annular recess in which the lower end of the stem is seated, said last named recess being of such depth as to enable engagement of said thrust plate with said surface without complete compression of the spring, said spring serving to maintain the thrust plate aligned with respect to the stem and also serving to urge the plate towards the diaphragm.

MARVIN H. GROVE.